(12) United States Patent
Khurana et al.

(10) Patent No.: US 12,511,372 B2
(45) Date of Patent: Dec. 30, 2025

(54) DATA ACCESSING WITH A VIRTUAL SANDBOX DATABASE

(71) Applicant: Databricks, Inc., San Francisco, CA (US)

(72) Inventors: Amandeep Khurana, San Francisco, CA (US); Nong Li, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/429,163

(22) Filed: Jan. 31, 2024

(65) Prior Publication Data

US 2024/0169055 A1    May 23, 2024

Related U.S. Application Data

(63) Continuation of application No. 18/170,585, filed on Feb. 17, 2023, now Pat. No. 11,971,981, which is a
(Continued)

(51) Int. Cl.
| | |
|---|---|
| *G06F 21/53* | (2013.01) |
| *G06F 16/248* | (2019.01) |
| *G06F 21/62* | (2013.01) |

(52) U.S. Cl.
CPC .......... *G06F 21/53* (2013.01); *G06F 16/248* (2019.01); *G06F 21/6218* (2013.01); *G06F 2221/2141* (2013.01)

(58) Field of Classification Search
CPC .... G06F 21/53; G06F 16/248; G06F 21/6218; G06F 2221/2141
(Continued)

(56) References Cited

U.S. PATENT DOCUMENTS

| | | | |
|---|---|---|---|
| 10,380,334 B2 * | 8/2019 | Gopi | G06F 21/6227 |
| 10,970,532 B1 * | 4/2021 | Song | G06V 30/413 |

(Continued)

FOREIGN PATENT DOCUMENTS

CN    109218296 A    1/2019

OTHER PUBLICATIONS

United States Office Action, U.S. Appl. No. 16/935,690, May 18, 2022, 26 pages.
(Continued)

*Primary Examiner* — Shin-Hon (Eric) Chen
*Assistant Examiner* — Saad Ahmad Abdullah
(74) *Attorney, Agent, or Firm* — Fenwick & West LLP (57) ABSTRACT

Various embodiments of the present technology generally relate to management of big data storage and data access control systems. In some embodiments, a data access system for use in multiple application service and multiple storage service environments comprises a sandbox database for users, wherein the sandbox database is a virtual database environment via which a user may access datasets according to one or more access policies. In some embodiments, the data access system receives a user request to access a dataset stored in a database into the sandbox environment, wherein the database is associated with the data access system. In response to the request, the data access system may retrieve the corresponding data from the database, determine any associated sandbox access policies, and generate an anonymized data table in the sandbox environment.

20 Claims, 8 Drawing Sheets

Related U.S. Application Data continuation of application No. 16/935,690, filed on Jul. 22, 2020, now Pat. No. 11,609,986.

(60) Provisional application No. 62/946,157, filed on Dec. 10, 2019.

(58) Field of Classification Search
USPC .......................................................... 726/27
See application file for complete search history.

(56) References Cited

U.S. PATENT DOCUMENTS

| | | | |
|---|---|---|---|
| 2018/0032747 A1* | 2/2018 | Whelan | G06F 16/2282 |
| 2019/0034321 A1* | 1/2019 | Martin | G06F 11/3696 |
| 2019/0370081 A1* | 12/2019 | Suresh | H04L 63/10 |
| 2020/0026710 A1 | 1/2020 | Przada et al. | |
| 2020/0151346 A1 | 5/2020 | Smyth et al. | |
| 2020/0265159 A1* | 8/2020 | Schmatz | H04L 9/008 |

OTHER PUBLICATIONS

United States Office Action, U.S. Appl. No. 18/170,585, Aug. 2, 2023, 10 pages.

* cited by examiner

| USERACTIVITY.WEB | | | |
|---|---|---|---|
| IP | Browser | Time | URL |
| 172.16.254.1 | Chrome | 14:56:33 | http://www.website.com/index.html |
| 968.21.543.4 | Edge | 2:43:04 | http://www.goggle.net/search/ |
| 358.30.043.3 | Firefox | 11:14:58 | http://www.yhoo.com/ |
| 024.21.542.6 | Chrome | 18:33:29 | http://www.monster.com/places |
| 098.92.953.7 | Explorer | 14:56:15 | http://www.a-store.com/shoes.html |
| 103.23.098.1 | Safari | 14:56:43 | http://www.online.com/internet |

FIGURE 6B

| SANDBOX.WEB | | | |
|---|---|---|---|
| IP | Browser | Time | URL |
| | Chrome | 14:56:33 | http://www.website.com/index.html |
| | Edge | 2:43:04 | http://www.goggle.net/search/ |
| | Firefox | 11:14:58 | http://www.yhoo.com/ |
| | Chrome | 18:33:29 | http://www.monster.com/places |
| | Explorer | 14:56:15 | http://www.a-store.com/shoes.html |
| | Safari | 14:56:43 | http://www.online.com/internet |

FIGURE 6C

| SANDBOX.WEB | | | |
|---|---|---|---|
| IP | Browser | Time | URL |
| XXX.XX.XXX.X | Chrome | 14:56:33 | http://www.website.com/index.html |
| XXX.XX.XXX.X | Edge | 2:43:04 | http://www.goggle.net/search/ |
| XXX.XX.XXX.X | Firefox | 11:14:58 | http://www.yhoo.com/ |
| XXX.XX.XXX.X | Chrome | 18:33:29 | http://www.monster.com/places |
| XXX.XX.XXX.X | Explorer | 14:56:15 | http://www.a-store.com/shoes.html |
| XXX.XX.XXX.X | Safari | 14:56:43 | http://www.online.com/internet |

FIGURE 6D

| SANDBOX.WEB | | |
|---|---|---|
| Browser | Time | URL |
| Chrome | 14:56:33 | http://www.website.com/index.html |
| Edge | 2:43:04 | http://www.goggle.net/search/ |
| Firefox | 11:14:58 | http://www.yhoo.com/ |
| Chrome | 18:33:29 | http://www.monster.com/places |
| Explorer | 14:56:15 | http://www.a-store.com/shoes.html |
| Safari | 14:56:43 | http://www.online.com/internet |

DATA ACCESSING WITH A VIRTUAL SANDBOX DATABASE

CROSS-REFERENCE TO RELATED APPLICATIONS

This application is a continuation of prior, co-pending U.S. application Ser. No. 18/170,585, filed on Feb. 17, 2023, which is a continuation of U.S. application Ser. No. 16/935,690, filed on Jul. 22, 2020, now U.S. Pat. No. 11,609,986, which claims priority to U.S. Provisional Application No. 62/946,157, filed on Dec. 10, 2019, all of which are incorporated herein by reference in their entirety for all purposes.

TECHNICAL FIELD

Various embodiments of the present technology generally relate to operation of a data access system for large data processing environments comprising multiple application services and multiple storage services. More specifically, some embodiments relate to a virtual sandbox database through which a user may access a virtual version of a dataset associated with a data access system.

BACKGROUND

The development of data-intensive applications to serve various needs, such as processing very large data sets, continues to grow as the possible number of applications grows too. Multiple storage services employed on clusters of computers are used to distribute various data. In addition to the multiple storage services, various large-scale processing applications have been developed to interact with the large-scale data sets and perform data management tasks, such as organizing and accessing the data and performing related operations with respect to the data.

To deploy the large-scale processing of data from multiple storage services in a computing environment, users are often required to individually configure programs to operate on a specific application service. These individually configured programs operating on each of the application services are typically not operable on a different application service or must be manually rebuilt by an administrator to adapt to the new application service environment. This rebuilding of each application service can be time consuming and cumbersome as each application service may have different deployment parameters. Each application service and storage service may require a determination of different data access and deployment requirements, such as determining authorization, performance, and caching parameters. Therefore, current techniques for enabling a user to operate the diverse application services available when accessing large-scale data sets from a variety of storage services are neither as efficient nor effective as they could be.

Providing sufficient access to data while maintaining data security and mitigating risk is a well-known challenge for data access systems having multiple storage systems and multiple application systems. Datasets may comprise increasingly large numbers of rows or entries and often contain sensitive information. However, the same datasets may contain lots of data useful for discovering important trends, testing software, updating systems, and other development purposes. Thus, maintaining a balance that allows data to be applied in a useful manner while preserving security is a complicated issue in modern big data systems.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for operating a data access system for large data processing environments comprising multiple application services and multiple storage services. In one implementation, a method for operating a data access system comprises receiving a user request from a sandbox environment to access a dataset, wherein the sandbox environment is a virtual database environment and the requested data is stored in a database associated with the data access system. The method further includes retrieving at least a portion of the dataset from the database, identifying at least one sandbox access policy associated with the user request and the dataset, and generating a view of the dataset in the sandbox environment, wherein the view displays one or more enabled elements of the dataset based on the at least one sandbox access policy.

In some embodiments, the method further comprises, upon identifying the at least one sandbox access policy, enabling one or more elements of the dataset in the view and/or disabling one or more elements of the dataset in the view. A portion of the dataset may be anonymized in the view based on the at least one sandbox access policy. In some embodiments, the user request indicates a number of requested dataset elements and generating the view of the dataset in the sandbox environment is based on the number of requested dataset elements. Furthermore, identifying the at least one sandbox access policy is performed by a metadata service within the data access system in some examples, generating the view of the dataset in the sandbox environment is performed by the metadata service, and the metadata service provides the sandbox environment with one or more dataset tools, wherein the one or more dataset tools are associated with the dataset and based on the at least one sandbox access policy.

In an additional embodiment, a computing apparatus comprises one or more computer-readable storage media, a processing system operatively coupled with the one or more computer-readable storage media, and program instructions stored on the one or more computer-readable storage media that, when read and executed by the processing system, direct the processing system to, receive a user request from a sandbox environment to access a dataset, wherein the sandbox environment is a virtual database environment and the dataset is stored in a database. In response to receiving the user request, the program instructions further direct the processing system to retrieve at least a portion of the dataset from the database, identify at least one sandbox access policy associated with the user request and the dataset, and generate a view of the dataset in the sandbox environment, wherein the view displays one or more enabled elements of the dataset based on the at least one sandbox access policy.

In yet another embodiment, one or more computer-readable storage media having program instructions stored thereon to facilitate data access environments comprising multiple application services and multiple storage services directs a processing system to, when read and executed by the processing system, receive a user request from a sandbox environment to access a dataset, wherein the sandbox environment is a virtual database environment and the dataset is stored in a database associated with a data access system. The program instructions further direct the processing system to retrieve at least a portion of the dataset from the database, identify at least one sandbox access policy associated with the user request and the dataset, and generate a view of the dataset in the sandbox environment, wherein the view displays one or more enabled elements of the dataset based on the at least one sandbox access policy.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 6A illustrates an example of a production level data table in accordance with some embodiments of the present technology;

FIG. 6B illustrates an example of an anonymized sandbox dataset in accordance with some embodiments of the present technology;

FIG. 6C illustrates an example of an anonymized sandbox dataset in accordance with some embodiments of the present technology;

FIG. 6D illustrates an example of an anonymized sandbox dataset in accordance with some embodiments of the present technology;

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For purposes of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

An active data access platform unifies and manages access for data consumers across multi-cloud, multi-datastore, and multi-tool environments. Tools such as Structured Query Language (SQL), Python, Spark, Map-Reduce, and R may apply machine learning and analytics to data. Infrastructures such as S3, Azure, Hadoop Distributed File System (HDFS), and on-premise databases serve as repositories for massive amounts of data. New compute and storage solutions are introduced constantly.

An effective data access platform enables a company to maintain accessibility, visibility, and security of data throughout the entire platform. However, when each solution has its own catalog, access controls, and auditing capabilities, data-driven organizations face issues achieving and maintaining these goals. In order to preserve agility, these organizations should be able to control fine-grained access to specific datasets, support a growing array of analytics tools, and capture detailed audit logs for usage insight and regulatory compliance.

In order to preserve database security, most users of a data access platform may not have permission to access various datasets or databases. Certain users may not have access to a dataset for a variety of reasons and gaining access to the database can be time-consuming or impossible, in certain situations. Datasets may contain private or sensitive information, such as personally identifiable information (PII), credit card information, sensitive corporate documents, or any other type of confidential information. Thus, it is necessary to provide limited access to databases comprising any sensitive information. However, restricting access to certain data to only a few users, such as administrators, authors, owners, and the like, limits how the information and data stored in a database can be used beneficially. Some users may require database access for developmental or informational purposes, such as running tests or discovering important trends.

Thus, a sandbox database for environments comprising multiple databases and multiple applications is disclosed. A sandbox database is a virtual database for isolated dataset access. Sandboxing allows a user to select a dataset from a database they may not normally have access to and view the dataset within the sandbox environment. Once within the sandbox environment, the user may use the data for various purposes, especially developmental. In some implementations, the sandbox environment may appear the same as the actual database environment, giving a user access to all or some of the same tools they would be able to use in the database.

Furthermore, some datasets may be too large for practical testing purposes. A user may want to run a series of tests or experiments on a dataset but may not need billions of rows to get a useful result. Thus, a user may only desire to run tests on 100,000 rows, for example. Sandboxing allows a user to bring a subset of data into the sandbox database, which can provide benefits such as only working with a relatively small amount of data or being able to run tests without risking making mistakes on an actual dataset. A user may experiment with data in the sandbox database without affecting the actual dataset. In this manner, the sandbox is an isolated environment that keeps actual data separate, safe from mistakes or other risks.

Figure 1:
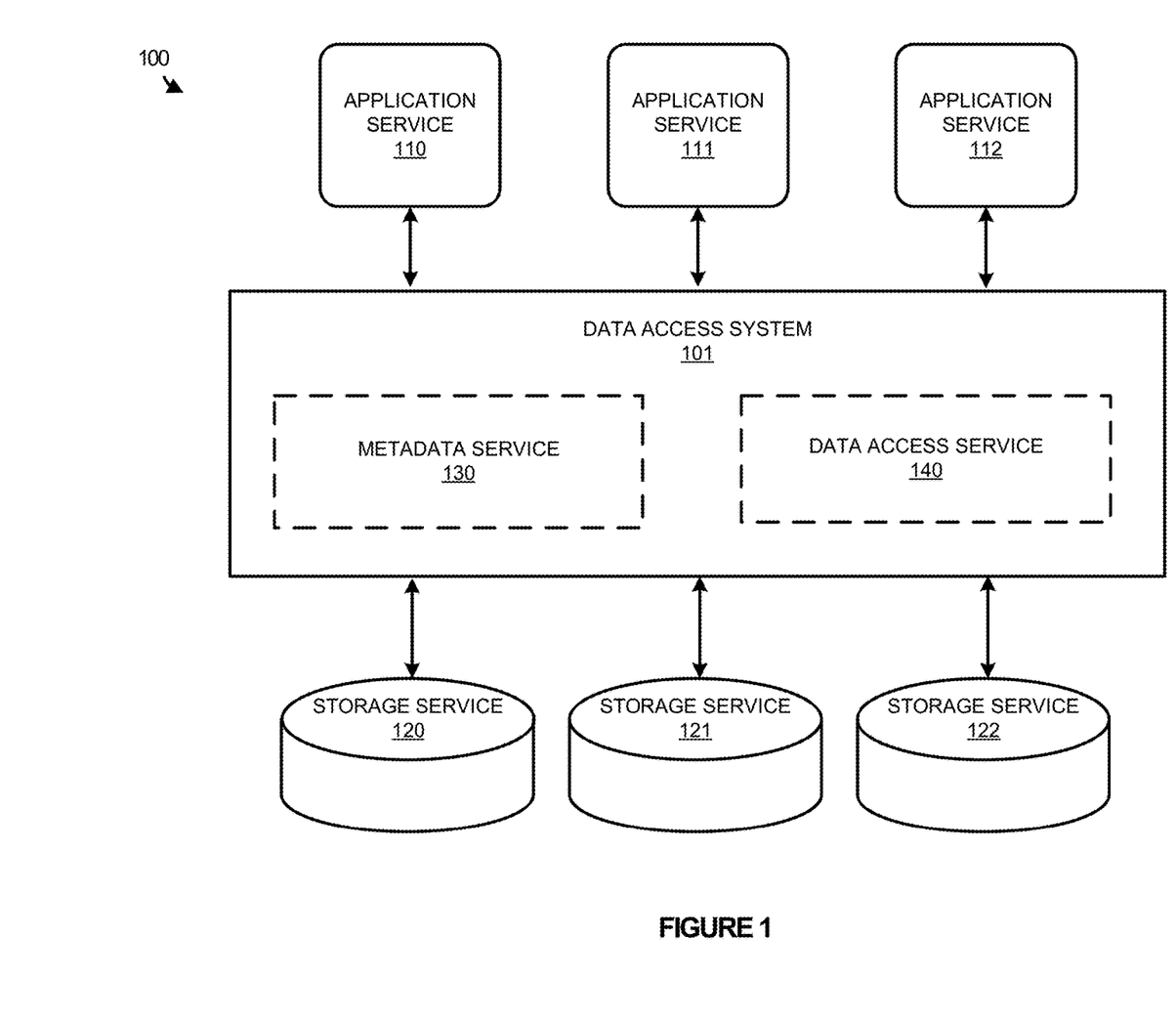
FIG. 1 illustrates a data access system for use in a multiple application service and multiple storage service environment in accordance with some embodiments of the present technology.

FIG. 1 illustrates computing environment 100 for operating a data access system according to some embodiments. Computing environment 100 includes data access system 101, application services 110-112, and storage services 120-122. Data access system 101 is an example of a modular data access system described herein and includes metadata service 130 and data access service 140 that may execute on one or more physical computing systems. The one or more computing systems may include desktop computing systems, server computing systems, or any other similar physical computing system capable of providing a platform for data access system 101. Metadata service 130 may include but is not limited to one or more audit engines, policy engines, schema registries, and the like. Metadata service 130 may also be implemented as a catalog service, in some examples, and may include multiple module, engines, registries, and combinations thereof. Modules, engines, and registries within metadata service 130 and data access service 140 are left out of FIG. 1 for the sake of clarity.

Data access service 140 may apply schema, access policies, and other transformations including but not limited to Universal Disk Formats (UDFs), pseudonymization, and masking to data as well as perform input/output functions and provision data to various analytics tool. Data may be provisioned for a user in a useful, consumable manner. Data access service 140 may comprise structured and unstructured data that is consumed in the form of views, tables, file formats, and the like that may be requested by a user. Data access service 140 may include functionality for interacting with several types of retrieval, streaming, and analytics tools including but not limited to Spark, Python, SQL engines, Notebooks, and business intelligence (BI) tools such as Tableau, Microsoft Power BI, and Microsoft Excel.

In some embodiments, metadata service 130 includes an audit engine, a policy engine, and a schema registry. An audit engine may provide a user with a detailed view of information related to their data. The information provided by an audit engine may include but is not limited to user activity, popular datasets, and commonly used tools. In some implementations, an audit engine may assist in implementing sandbox access policies. A policy engine may provide functionality for defining and managing data access policies that can be applied as data is accessed without interrupting service. Furthermore, a policy engine may define and manage data access policies for user sandboxes, which may be different than permissions for the individual databases. The policies in a policy engine may be defined and applied at several different granularities including database, dataset, rows, columns, and cells. In some embodiments, a policy engine includes role-based access control (RBAC) wherein permissions are based on roles, or personas, needing to perform specific, data-centric tasks. RBAC may be combined with Identity and Access Management (IAM) systems, such as Lightweight Directory Access Protocol (LDAP) based directories, to tie user groups into the role-based permissions, in an example. A policy engine may implement data obfuscation for differential privacy wherein sensitive data may be protected using obfuscation functions including but not limited to anonymization, pseudonymization, redaction, and masking for database or sandboxing purposes.

A schema registry, in some examples, may be an automated schema registry that automatically discovers, stores, and queries technical and operational metadata on datasets available to data consumers. The schema registry is responsible for storing platform-wide dataset metadata, in some examples, wherein the policy engine controls access to those datasets. Schemas, dataset sizes, ownership, tags, annotations, and basic quality metrics may be some of the information contained within the schema registry, in addition to other information. Users and applications may access the schema registry via various application programming interfaces (APIs) and/or graphical user interfaces (GUIs). A schema registry, in some implementations, serves as a central schema registry shared across multiple analytics tools. The examples of data access platform functionality provided in reference to FIG. 1 are provided solely for exemplary purposes. A data access system in accordance with the present technology may include modules, services, and functionalities in addition to, instead of, or in combination with any examples provided herein.

In operation, data access system 101 may perform sandboxing operations as described herein. The sandbox may be an additional database associated with data access system 101. In some scenarios, a sandbox is specific to a user, such as a personal sandbox environment, while in other scenarios, a user may access one or more team sandboxes having access rules according to the team and users of the team. A team sandbox may be utilized within a team for collaboration or sharing purposes. A sandbox virtual database within data access system 101 allows a user to import a dataset from a database such as from storage service 120, storage service 121, and storage service 122. Metadata service 130 may then write the dataset as a new entry into the sandbox according to access criteria associated with the user. The sandbox environment provides a means for easily obtaining samples or restricted access to datasets that a user may not otherwise be able to access, such as production datasets. Through the sandbox, a user may work with a digested, sampled, or restricted version of the dataset. In some scenarios, a user may not wish to use a full dataset. It may be unnecessary or impractical to run tests on a dataset with billions of rows, and the sandbox environment provides a resource for importing subsets of datasets according to the needs of the user.

Figure 2:
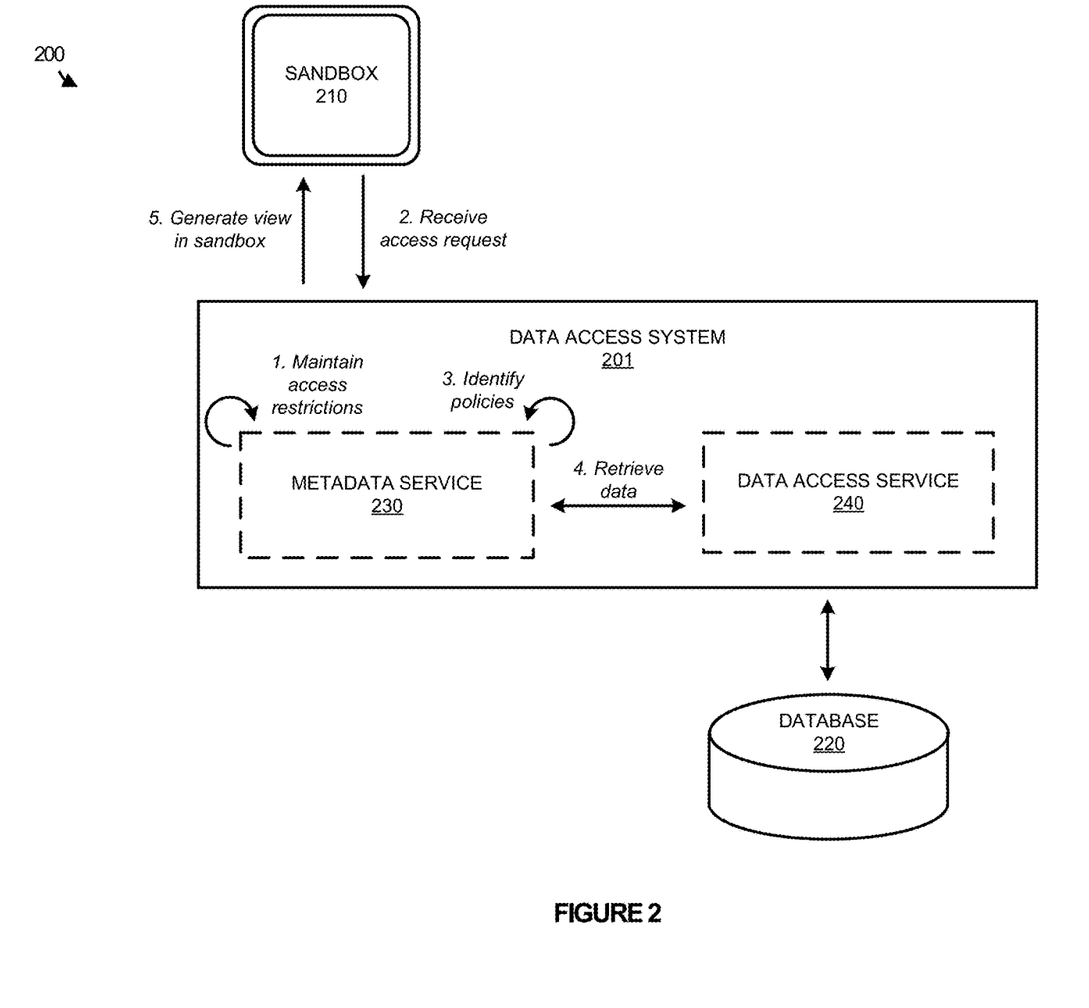
FIG. 2 illustrates an example of an access environment in which a sandbox database may be used to access virtual data in accordance with some embodiments of the present technology.

FIG. 2 illustrates data access environment 200 for sandboxing datasets in accordance with the present technology. Data access environment 200 includes data access system 201, sandbox 210, and database 220. Data access system comprises metadata service 230 and data access service 240. Data access system 201 may include the same modules and functionalities as data access system 101 from the previous example, or may comprise fewer features, additional features, similar features, or combinations thereof. In the present example, sandboxing functionality is implemented primarily within metadata service 230. Metadata service 230 may create mappings such that each user of the sandbox has their own virtual version of the sandbox specific to the permissions and access policies associated with each user. Metadata service 230 may serve a variety of additional functions within data access environment 200, but in the present example, a portion of metadata service 230 is carved out specifically to enable sandboxing.

When a user that does not have permission to access a database attempts to use a dataset within that database, they will not be able to access it. Often, production datasets, which may be of great importance for developmental purposes, are kept in databases that many users do not have access to. Thus, a user may be able to access the dataset through the sandbox instead. Although the sandbox database may appear in some embodiments, as the same database to all users, once it is opened, the contents of the sandbox database are specific to the user. Data can then be imported into the sandbox from within the sandbox environment. When the user requests to import a dataset, the metadata service may automatically write a new metadata entry, or sample, into the sandbox, in some examples. The metadata entry may be auto-sampled, anonymized, auto-anonymized, masked, or subjected to restrictions in any similar manner or subject to combinations thereof. In some examples, the metadata service may mask, redact, or anonymize PII or other sensitive information within the dataset. Furthermore, the dataset may be written in the sandbox according to rules defining how much of a dataset can be accessed, such as a number of rows, or for how long the dataset can be accessed by the user, such as a number of hours, days, weeks, or the like.

Referring back to FIG. 2, an example set of operations for writing a metadata entry into the sandbox is provided. In step 1, metadata service 230 maintains access restrictions and policies according to database permissions. In some examples, data access service 240 may store tables or other information related to access rules for users of one or more databases. An owner, administrator, author, or similar party may set up sandbox access restrictions for a database, in some embodiments. In step 2, data access system 201 receives a request from sandbox 210 to access a dataset from database 220. Sandbox 210, in the present example, is associated with a user requesting to view the dataset. In response to the request, metadata service 230 initiates production of the metadata entry into sandbox 210. In step 3, metadata service 230 identifies policies associated with sandbox 210. The policies associated with sandbox 210 may be based on a user, a user group or team, a location, a device, or similar factors that may affect permissions.

In step 4, metadata service 230 retrieves data according to the identified policies. In some embodiments, metadata service 230 does not directly access database 220. In the present example, metadata service 230 transfers the request according to the identified policies to data access service 240. Data access service 240 may then retrieve the data from database 220 and respond to metadata service 230 with the requested data. In other embodiments, metadata service 230, or an additional module of data access system 201 may retrieve the data from database 220. Once the data is retrieved from database 220 and returned to metadata service 230, metadata service 230 generates a view of the dataset in sandbox 210 as a metadata entry.

Figure 3:
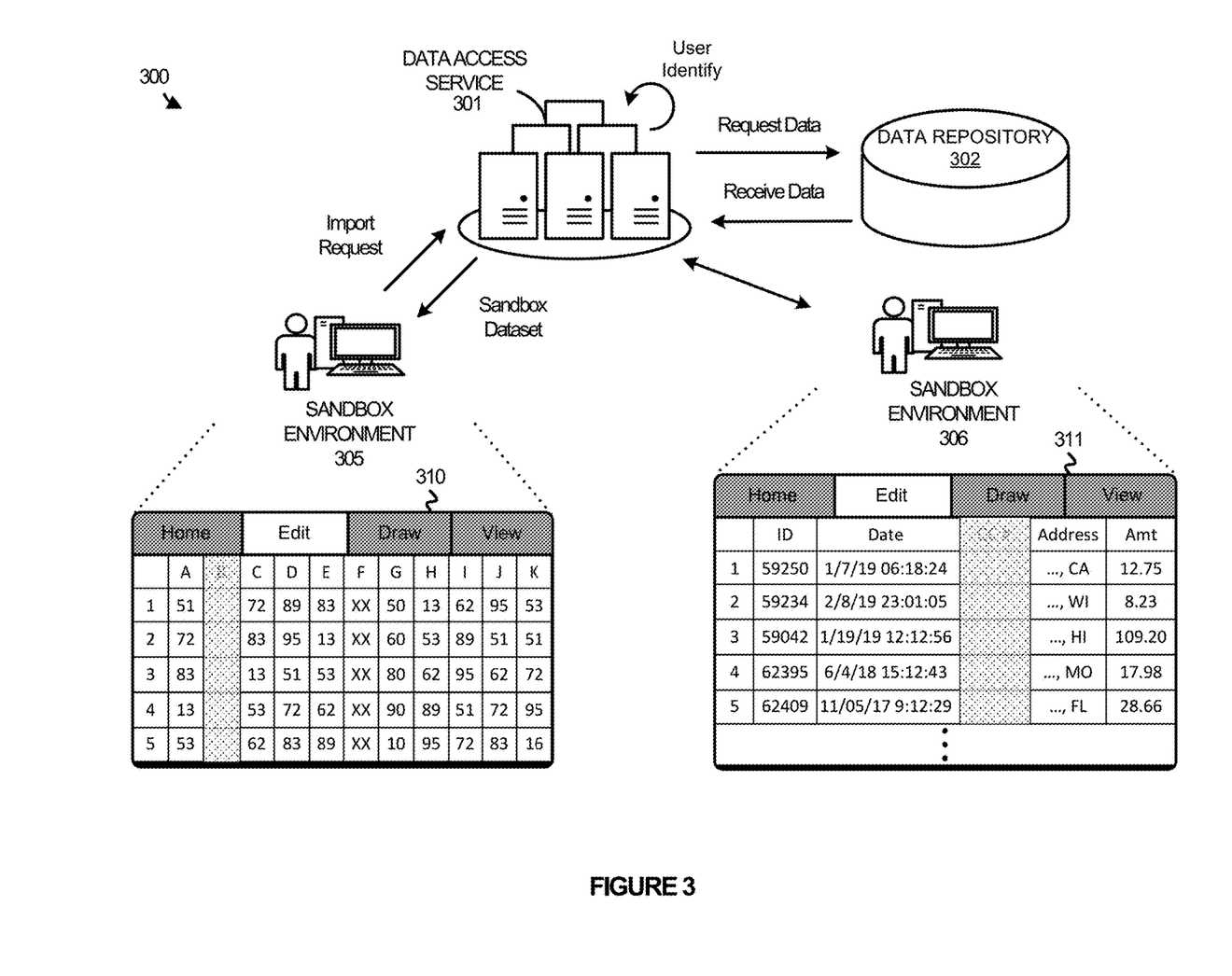
FIG. 3 illustrates a virtual sandboxing environment in accordance with some embodiments of the present technology.

FIG. 3 illustrates data access environment 300 for sandboxing in accordance with some embodiments of the present technology. Data access environment 300 includes data access service 301, data repository 302, sandbox environment 305, and sandbox environment 306. Sandbox environment 305 and sandbox environment 306 are each associated with a different user, device, environment, or other factor that may determine, at least in part, an access policy for data repository 302. In the present example, data access service 301 receives an import request from sandbox environment 305. Data access service 301 then identifies a user associated with the request and determines any associated access policies. Based on the access policies, data access service 301 requests and receives data from data repository 302. Upon receiving the data or dataset, data access service 301 writes a sandbox dataset into sandbox environment 305.

Sandbox environment 305 displays dataset view 310 in the virtual sandbox environment. In accordance with some embodiments, dataset view 310 includes the same tools and functionalities as would be available within the actual database. Dataset view 310 includes rows 1-5 and columns A, and C-K. The dataset is an anonymized version of the original dataset. The original dataset, or base table, may include additional rows or columns than what is available in dataset view 310. Column B and column F of the base table are presented in anonymized formats in dataset view 310. Column be is presented as a blurred column, wherein the content of column B is hidden from sandbox environment 305. The content of column F is filtered such that the content cannot be determined in sandbox environment 305. The content of each cell in column F is replaced with "XX," such that a user could see that there was content in each cell, but the content is anonymized. Many different or additional anonymization or data filtering methods may be used in accordance with the present technology other than those used as examples in the present embodiment.

Sandbox environment may request and receive data from data repository 302 similar to that of sandbox environment 305. However, sandbox environment 306 may be associated with a different user, a different device, a different group, or the like, such that the access policies determined for sandbox environment 306 are different than those determined for sandbox environment 305. In the present example, sandbox environment 306 has requested a different dataset than sandbox environment 305 requested. After data access service 301 writes the metadata entry into sandbox environment 306, dataset view 311 can be used within the sandbox environment. Rows 1-5 are the only rows shown in the present example for purposes of clarity, however, more rows are anticipated to be displayed in dataset view 311. Many datasets may originally contain at least millions of rows, and a sandbox dataset view may display all of those rows, or a significant subset of them. The sandbox dataset includes columns ID, date, address, and, amount. Furthermore, the sandbox dataset includes but does not display a row containing credit card number information.

In the present example of dataset view 311, a user may access transaction information stored in a base table in data repository 302 for developmental or analytical purposes but does not require access to credit card numbers associated with the various transactions. Thus, without subjecting sensitive transaction information to risk by allowing more users access to it, the sensitive information may be omitted from dataset view 311 such that users can access only what is useful to them and nothing unnecessary for their use purposes.

What a user can see after accessing the data table through a sandbox database is determined by a set of predefined access rules. A user may be provided with a sample of the base table, a digested version of the base table, or some other restricted version of the base table. However, the user must request the data through the sandbox environment in order to access the table and qualify for the designated restrictions. Once the data is imported into the sandbox, the user sees the content as if reading the original data in the database. In some examples, the sandbox environment appears exactly the same as the real dataset environment, but the data has been anonymized by the metadata service.

The tools available to a user within the sandbox database can be read directly from the original dataset tools. Thus, a user can experiment with the sample data the same way they would be able to with the actual production version. In some examples, a user may use the sandbox to access a dataset even if they have access to the actual production version. For example, if a user wishes to experiment or run tests with the dataset or a subset of the dataset, they may be able to perform those actions in the sandbox, without the risk of making mistakes or permanent changes to the real dataset. Furthermore, the sandbox may be a useful tool for users for the sole purpose of working with a smaller amount of data, as using a smaller set may make it easier and quicker to run tests, experiment, find trends, perform research, and the like.

In some embodiments, an owner, administrator, author, or similar user of the production version of the database determines and/or sets up what sandbox users can access. For example, an administrator may determine that users from a certain department can access up to 100,000,000 entries for a given dataset and that users from a different department may access 10 entries from the same dataset. Similarly, the administrator may set rules for the first department that the allowed entries should be the first 100,000,000 entries, a random set of 100,000,000 entries, 100,000,000 entries subject to a certain condition, and similar rules. The administrator may also set up the amount of time the sandbox dataset can be accessed. For the first department, the administrator may set a rule such that users can access the dataset for two weeks, while for the second department, the users may only be allowed to access the data for 24 hours. Specific content within a dataset may also have rules set up by the administrator. For example, certain users or departments may have access to all of the columns, while others may only have access to certain columns. Furthermore, some groups of users may not be able to see entries within a certain credential level, such as administrator activity. In some examples, user may be allowed to write results, changes, or the like back to the real database from the sandbox database.

Figure 4:
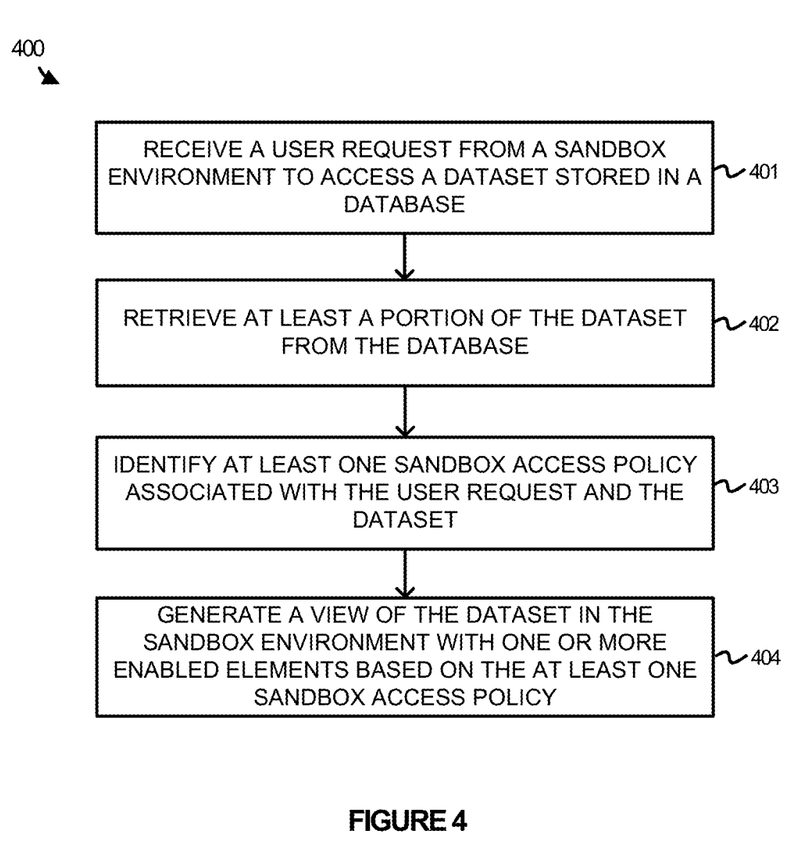
FIG. 4 illustrates a process for generating a dataset view in a sandbox environment in accordance with some embodiments of the present technology.

FIG. 4 illustrates sandboxing process 400 as an example in accordance with some embodiments of the present technology. In step 401, a data access platform receives a request from a user to access a dataset into the sandbox. The user is associated with an access level for the dataset from a restricted database. In step 402, the data access platform retrieves at least a portion of the dataset from the database, which may be based on the user's associated access level. The data access platform may utilize a metadata service, data access service, or other module of the data access platform to retrieve the dataset according the access policies. In some examples, retrieving the dataset may include querying the database for the data.

In step 403, the data access platform identifies at least one sandbox access policy associated with the user request and the dataset. In some examples, the user has access to a certain amount of data, such as a number of entries, from the dataset for a specified amount of time. Furthermore, restrictions may guide a metadata service to include or exclude certain cells, rows, columns, types of information, or other groups of content or combinations thereof.

In step 404, the data access platform generates a view of the dataset in the sandbox environment with one or more enabled elements according to the access policy for the user. In some embodiments, a metadata service module of the data access platform writes the dataset to the sandbox, such as in the example of FIG. 2. The data access platform of the present example may be data access system 101, data access system 201, data access service 301, or any other embodiment of a platform for providing access to data in a multiple application service and multiple storage service environment.

Figure 5:
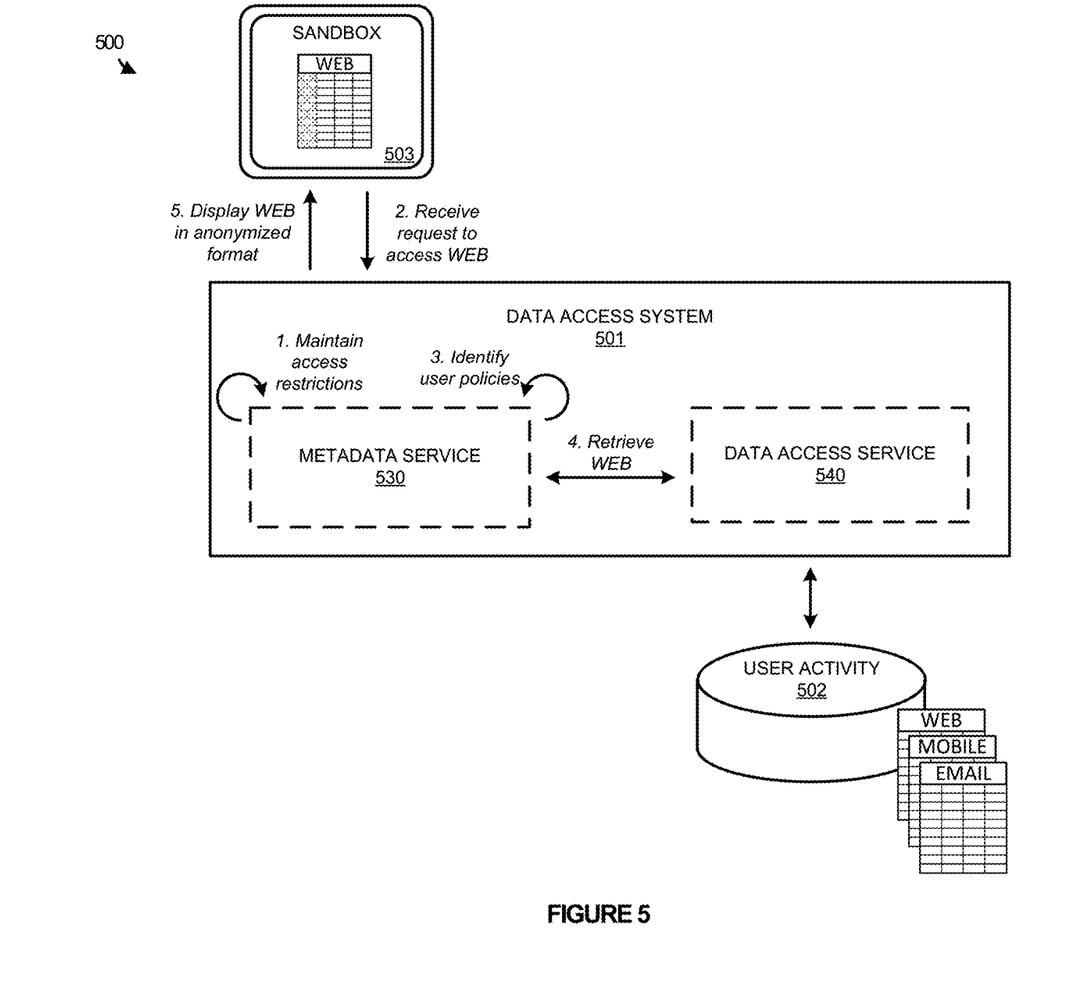
FIG. 5 illustrates an example of an access environment in which a sandbox database is used to access a dataset associated with a data access system in accordance with some embodiments of the present technology.

FIG. 5 illustrates an example of sandboxing in data access environment 500. Data access environment 500 includes data access system 501, user activity database 502, and sandbox 503. Data access system 501 comprises metadata service 530 and data access service 540. In the present example, a user of sandbox 503 may want to access information stored in user activity database 502 related to web-based user activity. In the present example, user activity database 502 includes at least the tables WEB, MOBILE, and EMAIL, which capture user activity data. The WEB table includes at least the columns IP address, browser, time, and URL. If the user of sandbox 503 in the present example tries to access the WEB table directly through the data access system (i.e., not through the sandbox), they will be denied access by data access system 501, because they are not authorized to access the base table. However, if a user tries to access the sandbox WEB table, data access system 501 will display the WEB table in the sandbox according to specified restrictions, because they are authorized to access some of the table through the sandbox environment.

The table displayed in the sandbox environment, in the present example, is a dynamic table. Within the dynamic table, cells, columns, rows, and other groups of data may be dynamically filtered, anonymized, hidden, disabled, enabled, redacted, masked, or similar according to access policies associated with the user. The access policies may define how many entries the user can see, what data the user can or cannot see, or how long the user can see the data. Restrictions may be set up by an owner of the dataset, an administrator, an author, or similar high-level user.

In step 1 of the present example, metadata service 530 maintains access restrictions for user activity database 502. The access restrictions include what data in the database can be accessed by users directly and what data in the database can be accessed by users through the sandbox. In step 2, data access system 501 receives a request from sandbox 503 to access the table WEB. The user of sandbox 503, in the present example, does not have access to the table WEB outside of the sandbox. In step 3, metadata service 530 identifies policies associated with the user requesting the WEB table. Metadata service 530 then identifies that the user of sandbox 503 has sandbox access to the first 100,000 rows of the WEB table and does not have access to the first column, IP address. Furthermore, the policies specify that the user may access the dataset for two weeks. In other examples, a user may have access to a specified number of entries chosen at random, in a certain order, subject to certain criteria, or similar.

In step 4, metadata service 530 retrieves the WEB table through data access service 540. Data access service 540, in the present example, queries user activity database 502 for the first 100,000 rows of the WEB table, wherein the IP address content is not requested. Upon receiving the data in metadata service 530, metadata service 530 generates and displays an anonymized version of WEB in sandbox 503. Once the data is generated in the sandbox, the user may have access to all of the same tools, controls, and functionality that would be available for the actual dataset. In the present example, the user may use the virtual database to experiment, test, perform research, or the like with the data for up to two weeks before they would need to request the data from the sandbox again. As can be seen in FIG. 5, the IP address column of the WEB table in sandbox 503 is blurred out. However, other methods of hiding data in the IP address column are anticipated.

FIGS. 6A-6D illustrate examples of the WEB table from the previous example of FIG. 5. FIG. 6A illustrates the first six rows of the USERACTIVITY.WEB table. The USERACTIVITY.WEB table is the original table stored in the user activity database (i.e., the base table). USERACTIVITY.WEB includes the columns IP, Browser, Time, and URL. In the base table, all of the content is shown. In many examples, a single user or only a few users may have access to the full, unfiltered table USERACTIVITY.WEB through the database. The user from the example of FIG. 5, however, only has access to the content through the sandbox, and cannot access any of the IP address information. Thus, FIGS. 6B-6D demonstrate examples of methods by which the IP address information may be omitted from the sandbox dataset. The sandbox dataset, in the present example, is titled SANDBOX.WEB. The user of sandbox 503 may access SANDBOX.WEB but may not access USERACTIVITY.WEB.

In FIG. 6B, the cells in the IP column are omitted, leaving a blank or blurred space in place of the column. In FIG. 6C, the IP address content is anonymized in the SANDBOX.WEB table by replacing the characters with "X" characters. The formats of the IP addresses are then visible to the user of sandbox 503. In FIG. 6D, the IP address column is omitted entirely. That is, the table written to sandbox 503, SANDBOX.WEB only contains the other three columns. In this manner, the user of sandbox 503 may not know that IP address information is stored in the user activity database at all. The examples given in FIG. 6B, FIG. 6C, and FIG. 6D are provided solely as examples and are not intended to limit that manner in which data may be written to a sandbox database according to predetermined access policies. Other anonymization techniques and data writing methods are anticipated.

Although many of the examples herein describe sandbox datasets for personal use (i.e., only one user can access the specific sandbox), sandboxes may be implemented for groups, teams, and collaboration purposes. A team sandbox, for example, may be accessible by any member of a team. Controls, views, and functionality within a team sandbox may be the same or different for users within a team. For example, every team member may be allowed to view the sandbox dataset, but only certain users may be allowed to edit the dataset, run tests, or use tools within the sandbox environment. In other examples, all members of a team may have the same access.

Figure 7:
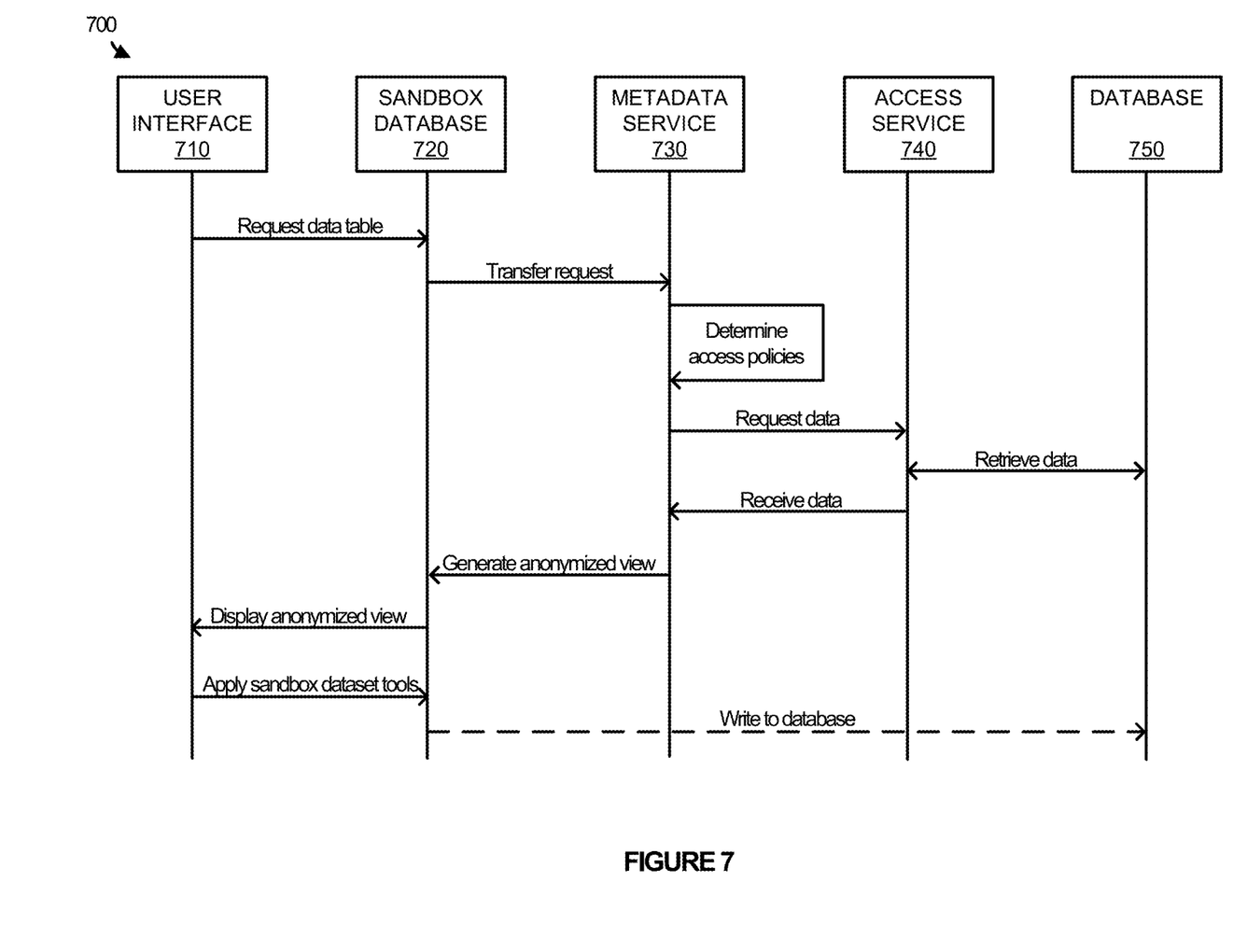
FIG. 7 illustrates a sequence in which a virtual sandbox dataset is created and applied in accordance with some embodiments of the present technology.

FIG. 7 illustrates sequence 700 for requesting, generating, and importing a virtual sandbox dataset. User interface 710 requests a data table through sandbox database 720. Thus, sandbox database 720 transfers the request to metadata service 730. After receiving the request, metadata service 730 determines access policies associated with the request. Based on the access policies, metadata service 730 requests the data from access service 740. Upon receiving the request for data from metadata service 730, access service 740 retrieves the data from database 750. In the present example, access service 740 retrieves the specified data from database 750 and transfers it back to metadata service 730. Once metadata service 730 has received the data from access service 740, it generates the anonymized view of the data table. In some examples, the request for data from the metadata service only requested the data that should go in the anonymized data table. Alternatively, the request for data may have requested the entire data table, and the metadata service then anonymizes all of the data accordingly. Furthermore, a combination of the two methods is anticipated. User interface 710 then displays the anonymized data table in the sandbox environment in which a user can apply the sandbox dataset tools through user interface 710.

In addition to any actions performed on the dataset in sandbox database 720, a user may optionally use the sandbox as a tool for editing before updating the dataset accordingly. A user's permissions settings would require that this action is allowed before making any changes to the actual production dataset. As shown in the final step in sequence 700, after applying any sandbox dataset tools, such as editing and testing, the results or updated data may be written back to database 750 from sandbox database 720. However, in some embodiments, writing back to the database may not be an option for any users.

Figure 8:
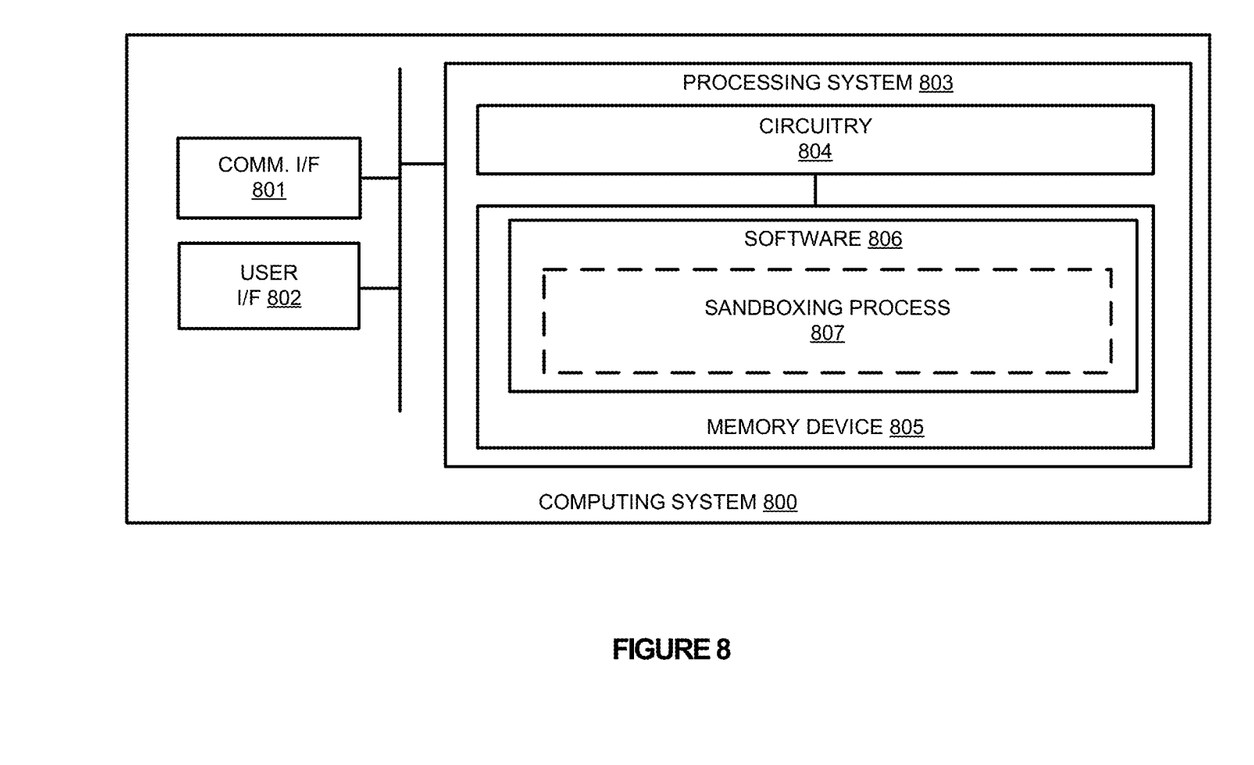
FIG. 8 illustrates a computing system for virtual sandboxing in a multiple application service and multiple storage service environment in accordance with some embodiments of the present technology.

FIG. 8 illustrates computing system 800 to perform sandboxing in a multiple application service and storage service environment according to one implementation. Computing system 800 is representative of any computing system or collection of systems with which the various operational architectures, processes, scenarios, and sequences disclosed herein for sandboxing in a data access system may be employed. Computing system 800 is an example of data access system 101 from FIG. 1, data access system 201 from FIG. 2, data access service 301 from FIG. 3, and data access system 501 from FIG. 5, although other examples may exist. Computing system 800 may be implemented as a single apparatus, system, or device or may be implemented in a distributed manner as multiple apparatuses, systems, or devices.

Computing system 800 comprises communication interface 801, user interface 802, and processing system 803. Processing system 803 is linked to communication interface 801 and user interface 802. Processing system 803 includes processing circuitry 804 and memory device 805 that stores operating software 806. Computing system 800 may include other well-known components such as batteries and enclosures that are not shown in the present example for clarity. Examples of computing system 800 include, but are not limited to, desktop computers, laptop computers, server computers, routers, web servers, cloud computing platforms, and data center equipment, as well as any other type of physical or virtual server machines, physical or virtual routers, containers, and any variation or combination thereof.

Processing system 803 loads and executes software 806 from memory device 805. Software 806 includes and implements sandboxing process 807, which is representative of the virtual sandbox database processes discussed with respect to the preceding figures. When executed by processing system 803 to provide sandbox databases, software 806 directs processing system 803 to operate as described herein for at least the various processes, operational scenarios, and sequences discussed in the foregoing implementations. Computing system 800 may optionally include additional devices, features, or functionality not discussed for purposes of brevity.

Referring still to FIG. 8, processing system 803 may comprise a micro-processor and other circuitry that retrieves and executes software 806 from memory device 805. Processing system 803 may be implemented within a single processing device but may also be distributed across multiple processing devices or sub-systems that cooperate in executing program instructions. Examples of processing system 803 include general purpose central processing units, graphical processing units, application specific processors, and logic devices, as well as any other type of processing devices, combinations, or variations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus, including combinations thereof. User interface 802 may be omitted in some examples.

Memory device 805 may comprise any computer-readable storage media readable by processing system 803 and capable of storing software 806. Memory device 805 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage media a propagated signal.

In addition to computer-readable storage media, in some implementations memory device 805 may also include computer-readable communication media over which at least some of software 806 may be communicated internally or externally. Memory device 805 may be implemented as a single storage device but may also be implemented across multiple storage devices or sub-systems co-located or distributed relative to each other. Memory device 805 may comprise additional elements, such as a controller, capable of communicating with processing system 803 or possibly other systems.

Software 806 (including sandboxing process 807) may be implemented in program instructions and among other functions may, when executed by processing system 803, direct processing system 803 to operate as described with respect to the various operational scenarios, sequences, and processes illustrated herein. For example, software 806 may include program instructions for implementing a virtual sandbox database for data access systems as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 806 may include additional processes, programs, or components, such as operating system software, virtualization software, or other application software. Software 806 may also comprise firmware or some other form of machine-readable processing instructions executable by processing system 803.

In general, software 806 may, when loaded into processing system 803 and executed, transform a suitable apparatus, system, or device (of which computing system 800 is representative) overall from a general-purpose computing system into a special-purpose computing system customized to provide a multiple application service and storage service environment comprising virtual sandboxing processes as described herein. Indeed, encoding software 806 on memory device 805 may transform the physical structure of memory device 805. The specific transformation of the physical structure may depend on various factors in different implementations of this description. Examples of such factors may include, but are not limited to, the technology used to implement the storage media of memory device 805 and whether the computer-storage media are characterized as primary or secondary storage, as well as other factors.

For example, if the computer readable storage media are implemented as semiconductor-based memory, software 806 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface 801 may include communication connections and devices that allow for communication with other computing systems (not shown) over communication networks (not shown). Examples of connections and devices that together allow for inter-system communication may include network interface cards, ports, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. Communication interface 801 may be configured to use Time Division Multiplex (TDM), Internet Protocol (IP), Ethernet, optical networking, wireless protocols, communication signaling, or some other communication format, including combinations thereof. The aforementioned media, connections, and devices are well known and need not be discussed at length here.

Communication between computing system 800 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
   receiving, from a client device, a request to access a dataset stored in a database maintained by a data access system, the request being associated with a first user of the data access system;
   determining whether the first user is authorized for direct access to the dataset;
   in response to determining that the first user is not authorized for the direct access, determining whether the first user is authorized for sandboxed access to the dataset;
   in response to determining that the first user is authorized for the sandboxed access, determining a first user group of the first user from among a plurality of user groups;
   identifying a first sandbox access policy assigned to the first user group, the first sandbox access policy defining element-level transformations comprising at least one of: excluding, anonymizing, pseudonymizing, redacting, or masking specified rows or columns of the dataset, wherein the first sandbox access policy further defines at least one of: a maximum number of dataset entries accessible in a sandbox environment, a selection criterion for the entries, or a maximum duration for the sandboxed access;
   generating a first sandbox dataset based on the first sandbox access policy, the first sandbox dataset having one or more elements of the dataset excluded based in part on the first sandbox access policy; and
   writing the first sandbox dataset into the sandbox environment, the sandbox environment comprising a virtual database environment from which the first user can read the first sandbox dataset, wherein the sandbox environment is isolated from the database, and the generated first sandbox dataset is independent from the dataset stored in the database.

2. The method of claim 1, further comprising:
   receiving a subsequent request to access a second dataset stored in the database maintained by the data access system, the subsequent request being associated with a second user of the data access system;

determining that the second user is included in a second user group of the plurality of user groups, the second user group being different than the first user group;

identifying a second sandbox access policy assigned to the second user group, the second sandbox access policy being different from the first sandbox access policy; and generating a second sandbox dataset based on the second sandbox access policy, the second sandbox dataset having one or more elements of the second dataset excluded based in part on the second sandbox access policy.

3. The method of claim 2, wherein the second sandbox dataset includes at least one element of the one or more elements of the dataset that were excluded from the first sandbox dataset.

4. The method of claim 1, wherein the first sandbox access policy is defined for a first role or persona and a second sandbox access policy assigned to a second user group from the plurality of user groups is defined for a second role or persona that is different than the first role or persona.

5. The method of claim 1, wherein generating the first sandbox dataset based on the first sandbox access policy comprises:
identifying a first element of the dataset; and
excluding, based on permissions defined in the first sandbox access policy, the first element of the dataset from the first sandbox dataset.

6. The method of claim 1, wherein generating the first sandbox dataset based on the first sandbox access policy comprises:
identifying a first element of the dataset; and
obfuscating, based on permissions defined in the first sandbox access policy, the first element of the dataset in the first sandbox dataset.

7. The method of claim 1, wherein the first sandbox dataset can be read from the sandbox environment by at least a second user included in the first user group.

8. The method of claim 1, wherein the first sandbox access policy defines permissions for accessing data stored in the database maintained by the data access system.

9. A non-transitory computer-readable medium comprising stored instructions that when executed by one or more processors of one or more computing devices, cause the one or more computing devices to:
receive, from a client device, a request to access a dataset stored in a database maintained by a data access system, the request being associated with a first user of the data access system;
determine whether the first user is authorized for direct access to the dataset;
in response to determining that the first user is not authorized for the direct access, determine whether the first user is authorized for sandboxed access to the dataset;
in response to determining that the first user is authorized for the sandboxed access, determine a first user group of the first user from among a plurality of user groups;
identify a first sandbox access policy assigned to the first user group, the first sandbox access policy defining element-level transformations comprising at least one of: excluding, anonymizing, pseudonymizing, redacting, or masking specified rows or columns of the dataset, wherein the first sandbox access policy further defines at least one of: a maximum number of dataset entries accessible in a sandbox environment, a selection criterion for the entries, or a maximum duration for the sandboxed access;
generate a first sandbox dataset based on the first sandbox access policy, the first sandbox dataset having one or more elements of the dataset excluded based in part on the first sandbox access policy; and
write the first sandbox dataset into the sandbox environment, the sandbox environment comprising a virtual database environment from which the first user can read the first sandbox dataset, wherein the sandbox environment is isolated from the database, and the generated first sandbox dataset is independent from the dataset stored in the database.

10. The non-transitory computer-readable medium of claim 9, wherein the instructions further cause the one or more computing devices to:
receive a subsequent request to access a second dataset stored in the database maintained by the data access system, the subsequent request being associated with a second user of the data access system;
determine that the second user is included in a second user group of the plurality of user groups, the second user group being different than the first user group;
identify a second sandbox access policy assigned to the second user group, the second sandbox access policy being different from the first sandbox access policy; and
generate a second sandbox dataset based on the second sandbox access policy, the second sandbox dataset having one or more elements of the second dataset excluded based in part on the second sandbox access policy.

11. The non-transitory computer-readable medium of claim 10, wherein the second sandbox dataset includes at least one element of the one or more elements of the dataset that were excluded from the first sandbox dataset.

12. The non-transitory computer-readable medium of claim 9, wherein the first sandbox access policy is defined for a first role or persona and a second sandbox access policy assigned to a second user group from the plurality of user groups is defined for a second role or persona that is different than the first role or persona.

13. The non-transitory computer-readable medium of claim 9, wherein the first sandbox dataset can be read from the sandbox environment by at least a second user included in the first user group.

14. The non-transitory computer-readable medium of claim 9, wherein the first sandbox access policy defines permissions for accessing data stored in the database maintained by the data access system.

15. A system comprising:
one or more computer processors; and
one or more computer-readable mediums storing instructions that, when executed by the one or more computer processors, cause the system to:
receive, from a client device, a request to access a dataset stored in a database maintained by a data access system, the request being associated with a first user of the data access system;
determine whether the first user is authorized for direct access to the dataset;
in response to determining that the first user is not authorized for the direct access, determine whether the first user is authorized for sandboxed access to the dataset;

in response to determining that the first user is authorized for the sandboxed access, determine a first user group of the first user from among a plurality of user groups;

identify a first sandbox access policy assigned to the first user group, the first sandbox access policy defining element-level transformations comprising at least one of: excluding, anonymizing, pseudonymizing, redacting, or masking specified rows or columns of the dataset, wherein the first sandbox access policy further defines at least one of: a maximum number of dataset entries accessible in a sandbox environment, a selection criterion for the entries, or a maximum duration for the sandboxed access;

generate a first sandbox dataset based on the first sandbox access policy, the first sandbox dataset having one or more elements of the dataset excluded based in part on the first sandbox access policy; and write the first sandbox dataset into the sandbox environment, the sandbox environment comprising a virtual database environment from which the first user can read the first sandbox dataset, wherein the sandbox environment is isolated from the database, and the generated first sandbox dataset is independent from the dataset stored in the database.

16. The system of claim 15, wherein the instructions further cause the system to:

receive a subsequent request to access a second dataset stored in the database maintained by the data access system, the subsequent request being associated with a second user of the data access system;

determine that the second user is included in a second user group of the plurality of user groups, the second user group being different than the first user group;

identify a second sandbox access policy assigned to the second user group, the second sandbox access policy being different from the first sandbox access policy; and generate a second sandbox dataset based on the second sandbox access policy, the second sandbox dataset having one or more elements of the second dataset excluded based in part on the second sandbox access policy.

17. The system of claim 16, wherein the second sandbox dataset includes at least one element of the one or more elements of the dataset that were excluded from the first sandbox dataset.

18. The system of claim 15, wherein the first sandbox access policy is defined for a first role or persona and a second sandbox access policy assigned to a second user group from the plurality of user groups is defined for a second role or persona that is different than the first role or persona.

19. The system of claim 15, wherein the first sandbox dataset can be read from the sandbox environment by at least a second user included in the first user group.

20. The system of claim 15, wherein the first sandbox access policy defines permissions for accessing data stored in the database maintained by the data access system.

* * * * *